United States Patent
Tseng

(10) Patent No.: US 11,132,711 B2
(45) Date of Patent: Sep. 28, 2021

(54) INLINE EXPANSION OF MAPS IN CONTENT ITEMS

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 741 days.

(21) Appl. No.: 14/581,562

(22) Filed: Dec. 23, 2014

(65) Prior Publication Data
US 2016/0180394 A1 Jun. 23, 2016

(51) Int. Cl.
*G06Q 30/00* (2012.01)
*G06Q 30/02* (2012.01)
*G06Q 50/00* (2012.01)
*G06F 16/29* (2019.01)
*G06F 16/9537* (2019.01)

(52) U.S. Cl.
CPC ......... *G06Q 30/0261* (2013.01); *G06F 16/29* (2019.01); *G06F 16/9537* (2019.01); *G06Q 30/0277* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2007/0100867 A1* | 5/2007 | Celik | G06Q 30/02 |
| 2008/0248815 A1* | 10/2008 | Busch | H04W 4/029 |
| | | | 455/456.5 |
| 2009/0307188 A1* | 12/2009 | Oldham | G06F 3/0482 |
| 2010/0114717 A1* | 5/2010 | Lebeau | G06Q 30/0276 |
| | | | 705/14.72 |
| 2014/0297377 A1* | 10/2014 | Bhat | G06Q 30/0276 |
| | | | 705/14.5 |
| 2014/0365321 A1* | 12/2014 | Koningstein | G06Q 10/10 |
| | | | 705/14.73 |
| 2016/0062955 A1* | 3/2016 | Maertens | H04W 4/20 |
| | | | 715/202 |
| 2016/0117388 A1* | 4/2016 | Fan | G06F 17/30864 |
| | | | 717/178 |

* cited by examiner

*Primary Examiner* — Meredith A Long
(74) *Attorney, Agent, or Firm* — Fenwick & West LLP

(57) ABSTRACT

A client device receives advertisement content associated with an entity having a physical location and one or more instructions that, when executed, present information identifying the physical location. The client device displays an ad unit including the received advertisement content and a link associated with the instructions to present the information identifying the physical location. If a user selects the link, the client device presents information identifying the physical location, such as a map, within the ad unit. Additional instruction may be included in the advertisement that, when executed by the client device, execute an application installed on the client device to provide directions to the physical location.

18 Claims, 6 Drawing Sheets

INLINE EXPANSION OF MAPS IN CONTENT ITEMS

BACKGROUND

This disclosure relates generally to presentation of content items, and in particular to content items associated with entities having physical locations.

Entities may promote goods and services to users via content presented to the users by online systems. Presenting content items identifying or describing goods or services via an online system enables users to quickly take actions regarding the goods or services. For example, users may interact with a content item describing an item to access a webpage of an entity associated with the item and to purchase the items. Many of the actions regarding goods or services may be taken without leaving the context of content items describing the goods or services.

However, while content items presented by an online system enable users to easily take actions regarding products or services available online, content items presented by an online system may also identify entities having physical locations. Many presented content items that identify an entity having a physical location do not provide sufficient information about the physical location of the entity to allow users to easily take action on the ads. For example, to obtain more information about a physical location of an entity identified by a content item, a user may often leave the context of the content item to retrieve the information. Additionally, reaching a physical location of an entity identified by a content item presented by an online system often involves the user travelling some distance to reach the physical location of the entities. Furthermore, if users are unaware of the physical locations associated with entities identified by content items, the users may be unmotivated to seek out the physical locations.

SUMMARY

To encourage users to take actions on advertisements for entities having physical locations, an online system displays advertisements for entities having physical locations that include information about the physical locations. The online system selects advertisement content associated with an entity having a physical location for display to a user via a client device and determines whether the client device is in proximity to the physical location of the entity associated with the advertisement content. For example, the online system determines a distance between the location of the client device and the physical location of the entity associated with the advertisement and determines the client device is in proximity to the physical location of the entity if the distance is less than a threshold value. As another example, the online system determines a travel time from the location of the client device to the physical location of the entity and determines the client device is in proximity to the physical location of the entity is less than a threshold value. In some embodiments, the online system determines whether client device is in proximity to the physical location of the entity at the time the advertisement content is selected for display to the user. Alternatively, the online system determines whether the client device was in proximity to the physical location of the entity at a time before selection of the advertisement content or determines whether the client device is expected to be in proximity of the physical location at a time after selection of the advertisement content.

The online system sends the advertisement content associated with the physical location to the client device for presentation to a user. When presenting the advertisement content, the client device displays an ad unit including the received advertisement content as well as a link to a map identifying the physical location of the entity. In response to receiving a selection of the link, the client device displays the map within the ad unit. An address of the physical location and a map image may be pre-loaded when the ad unit is displayed on the client device but prior to receipt of a selection of the link included in the ad content, reducing an amount of time for the client device to display the map when the link is selected. After the map is displayed, the ad unit may present additional links that, when selected, execute a navigation application on the client device populated with the address of the physical location, execute the navigation application with a request for directions to the physical location, or execute any other suitable functionality. Therefore, a user of the online system may directly interact with the ad unit to identify a physical location of the entity and navigate to the physical location.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
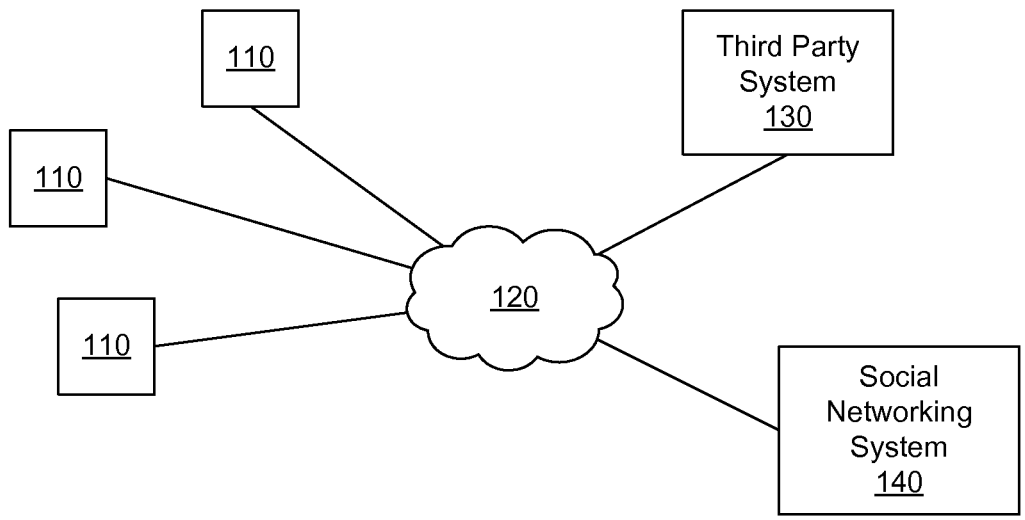
FIG. 1 is a block diagram of a system environment in which a social networking system operates, according to one embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™. The client devices 110 may also execute other applications providing various functionality to client device users. For example, a client devices 110 executes a navigation application, a restaurant reservation applications, an application enabling users to place orders at restaurant, a ticket reservation application, an appointment scheduling application, and so forth.

Additionally, a client device 110 include one or more position sensors that determine a physical location of the client device 110 based on global positioning, Internet Protocol (IP) address, triangulation to cellular towers, or any other mechanism. In one embodiment, a user of the client device 110 may enable or disable a position sensor included on the client device 110 or configure the one or more position sensors not to determine the physical location of the client device 110. Alternatively, the one or more position sensors included in the client device 110 do not determine the physical location of the client device 110 unless the user configures the one or more position sensors to determine the client device's physical location. Additionally, the client device 110 may identify the location of the client device 110 to the social networking system 140 or to one or more third party systems 130 if the user stores one or more privacy settings on the client device 110 authorizing the client device 110 to share its physical location with the social networking system 140 or with one or more third party system 130; a privacy setting may specifically identify entities authorized to receive the physical location of the client device 110 or may globally authorize identification of the physical location of the client device 110 to other entities.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
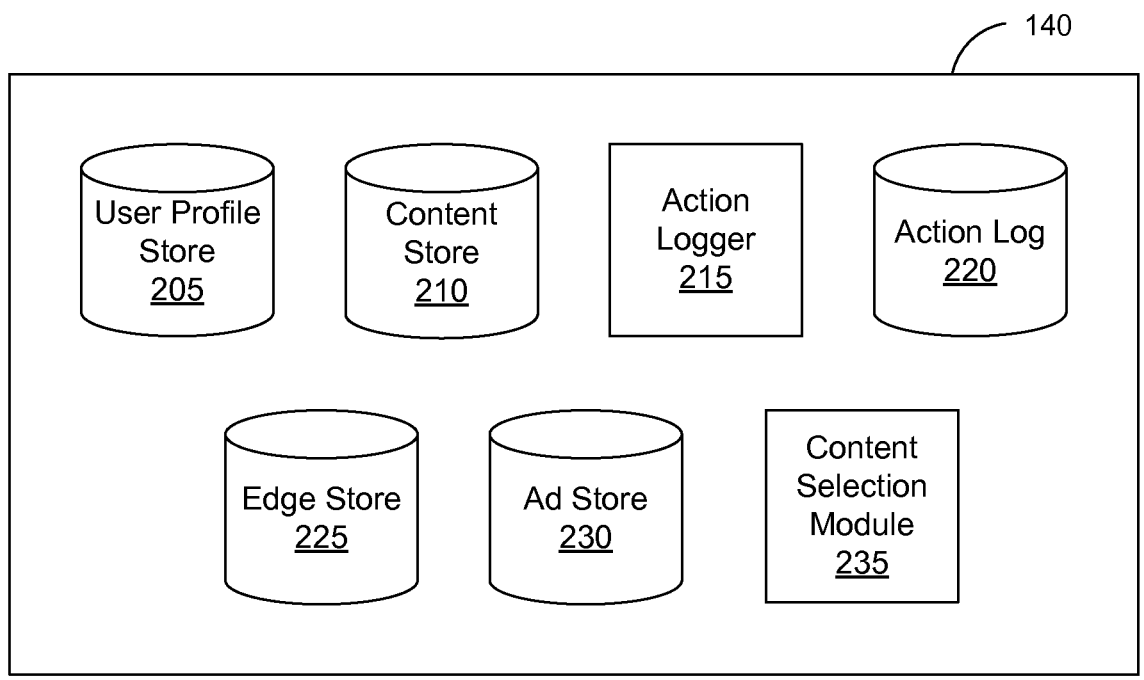
FIG. 2 is a block diagram of a social networking system, according to one embodiment.

FIG. 2 is an example block diagram of an architecture of the social networking system 140. The social networking system 140 shown in FIG. 2 includes a user profile store 205, a content store 210, an action logger 215, an action log 220, an edge store 225, an advertisement ("ad") store 230, and a content selection module 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location, and the like. A user profile may also store other information provided by the user, for example, images or videos. In certain embodiments, images of users may be tagged with information identifying social networking system users displayed in an image. A user profile in the user profile store 205 may also maintain references to actions by the corresponding user performed on content items in the content store 210 and stored in the action log 220.

Furthermore, a user profile may include one or more physical locations associated with a user corresponding to the user profile. For example, the user profile includes a current physical location of the user, which may be received or otherwise obtained from a client device 110 associated with the user, as well as one or more prior locations of the user. As other examples, the social networking system 140 may infer a current location of the user from actions associated with the user within a specified time interval from a current time or from content provided to the social networking system 140 by the user. The prior locations of the user may be specified by the user or may be physical locations previously received from the client device 110 associated with the user and included in the user profile of the user.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, and checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action log 220 by the application for recordation and association with the user by the social networking system 140.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object, in a topic, or in another user in the social networking system 140 based on the actions performed by the user. A user's affinity may be computed by the social networking system 140 over time to approximate the user's interest in an object, a topic, or another user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad store 230. An advertisement request includes advertisement content, also referred to as an "advertisement," and a bid amount. The advertisement content is text, image, audio, video, or any other suitable data presented to a user to promote an entity (e.g., a business or an organization). In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the social networking system 140 if the advertisement in the ad request is presented to a user, if the advertisement in the ad request receives a user interaction, or based on any other suitable condition. For example, the bid amount specifies a monetary amount that the social networking system 140 receives from the advertiser if the advertisement included in an ad request including the bid amount is displayed. In some embodiments, the expected value to the online system 140 of presenting the advertisement content may be determined by multiplying the bid amount by a probability of the advertisement content being accessed by a user.

An ad request may also be associated with a physical location, such as a physical location of an entity (e.g., a business). If an entity associated with ad content has one or more physical locations, the ad request may be associated with an identifier of each physical location (e.g., a street address or GPS coordinates). Alternatively, the ad request may be associated with a link to a website, a database, or another source including a list of identifiers of physical locations associated with the entity.

Additionally, an advertisement request may include one or more targeting criteria specified by the advertiser. Targeting criteria included in an advertisement request specify one or more characteristics of users eligible to be presented with content in the advertisement request. For example, targeting criteria specify user profile information, edges, or actions associated with a user to identify users having users associated with user profile information, edges, or actions satisfying at least one of the targeting criteria. Hence, the targeting criteria allow an advertiser to identify groups of users matching specific targeting criteria, simplifying subsequent distribution of content to groups of users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third-party system 130, or performed any other suitable action. Including actions in the targeting criteria allows advertisers to further refine users eligible to be presented with advertisement content from an advertisement request. As another example, targeting criteria identifies users having a connection to another user or object or having a particular type of connection to another user or object. In another example, targeting criteria identifies users who are in, or who have been in proximity, to a physical location of an entity associated with an ad request.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting an ad request or a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, stories or other data associated with users connected to the identified user are retrieved. Additionally, one or more advertisement requests ("ad requests") may be retrieved from the ad request store 230 The retrieved stories, ad requests, or other content items, are analyzed by the content selection module 235 to identify candidate content that is likely to be relevant to the identified user. For example, stories associated with users not connected to the identified user or stories associated with users for which the identified user has less than a threshold affinity are discarded as candidate content. Based on various criteria, the content selection module 235 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the social networking system 140.

Hence, the content selection module 235 selects advertisements from ad requests in the ad store 230 for presentation to users via one or more client devices 110. Advertisement content from a selected ad request is communicated from the social networking system 140 to a client device 110 of the user for presentation. Advertisement content from a selected ad request may be communicated to client devices 110 that are associated with physical locations. For example, the content selection module 235 presents advertisements associated with stores, restaurants, coffee shops, tourist attractions, service providers (e.g., doctors, mechanics, or child care providers), or any other type of entity having physical locations (as opposed to entities operating entirely online, for example) to users. When presenting advertisement content associated with a physical location, the content selection module 235 may include information about the physical location in the ad to aid a user in performing one or more actions associated with the advertisement content.

Figure 3:
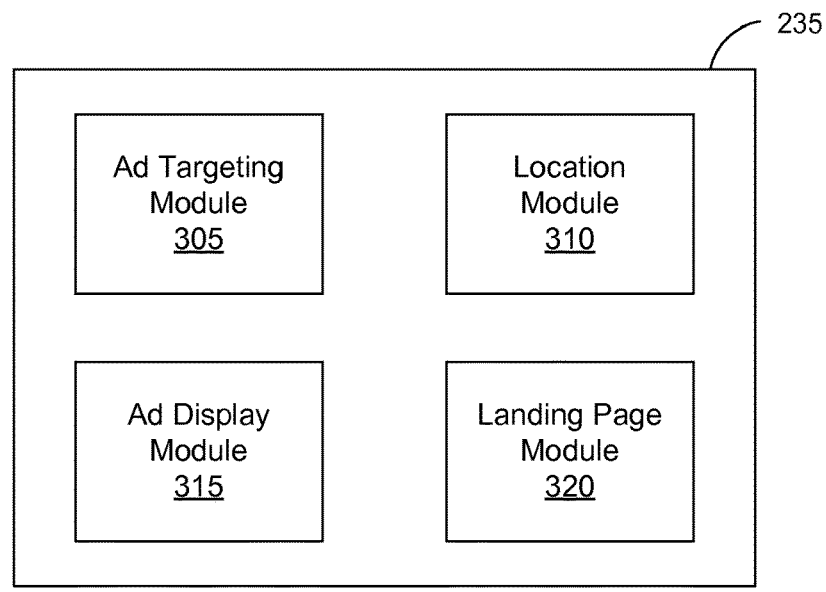
FIG. 3 is a block diagram of an ad server, according to one embodiment.

FIG. 3 is a block diagram of one embodiment of the content selection module 235. In one embodiment, the content selection module 235 includes an advertisement ("ad") targeting module 305, a location module 310, an ad display module 315, and a landing page module 320. Other embodiments of the ad server 235 may include additional or different components, and the functionality described herein may be distributed differently between the components.

The ad targeting module 305 selects ad requests to present to a user of the client device 110. In one embodiment, the ad targeting module 305 selects ad requests from the ad store 230 to display to the user based on targeting criteria of the ad requests, user profile information of the user, bid amounts associated with ad requests, or other factors. Any of a variety of ad targeting and bidding methods may be used to select one or more ads for display to a user. One embodiment of the ad targeting module 310 selects ads based in part on a predicted future location of the client device 110. For example, if the user is predicted to travel a particular route based on the location history of the client device 110, the ad targeting module 310 selects ads to display to the user that are associated with entities having physical locations on or near the user's predicted route.

The location module 310 determines a current location of a client device, and may determine historical locations of the client device 110. If the user of the client device 110 has authorized the social networking system 140 to access location information maintained by the client device 110, the location module 310 may obtain a physical location determined by the client device 110 from the client device 110. Furthermore, by monitoring physical locations of the client device 110 over time, the location module 310 may maintain a history of physical locations of the client device 110. For example, the location module 310 periodically obtains a physical location from the client device 110 and stores the physical locations in the user's user profile.

In one embodiment, the location module 310 uses the history of physical locations to predict a future location of the client device 110. The location module 310 uses the location history to identify patterns in the user's movements. For example, the location module 310 uses the history of physical locations of the client device 110 to identify physical locations the user frequents, such as home, work, and the route the user travels between home and work. Similarly, the location module 310 uses the history of physical locations to identify times or days of the week the client device 110 visits particular locations. For example, based on the history of physical locations of the client device 110, the location module 310 determines the user is typically at a physical location corresponding to work between 8 am and 5 pm and at a physical location corresponding to home from 6 pm to 7 am each day from Monday to Friday, and the user commutes via a particular route from 7 am to 8 am and 5 pm to 6 pm. Based on patterns observed in the history of physical locations, the location module 310 predicts physical locations of the client device 110 at particular time. For example, the location module 310 predicts the client device 110 will be at the physical location for the user's work Monday at 1 pm based on the observed patterns.

The location module 310 also determines physical locations of entities that are in proximity to a physical location of the user's client device and that are associated with ad requests. When an ad request is selected for display to a user, the location module 310 accesses location information of an entity associated with the ad request. For example, the location module 310 retrieves the entity's physical location or physical locations from public map data, from a website associated with the entity, from the ad store 230, which may include physical locations provided by the entity or by an advertiser associated with the entity, or from other sources. In various embodiments, the location module 310 determines physical locations of entities are in proximity to a location of a client device 110 associated with the user by determining a distance between a current physical location of the client device 110 (or one or more historical locations of the user or client device 110); if the distance is less than a threshold value, the location module 310 determines the physical location of the client device 110 is in proximity to a physical location of the entity. Alternatively, the location module 310 determines a time for the user to travel from a physical location associated with the client device 110 to a physical location associated with an entity (a "travel time"), and determines the physical location of the client device 110 is in proximity to the physical location associated with the entity if the time for the user to travel is less than a threshold value.

In one embodiment, the location module 310 determines a distance or travel time from the physical location of the client device 110 to the physical location of the entity associated with an ad at the time the ad is selected for display via the client device 110. If the distance or travel time is less than a threshold distance or less than a threshold time, the location module 310 determines the client device 110 is currently in proximity to the physical location of the entity. A threshold distance may be a fixed value, such as one mile. Alternatively, the location module 310 determines a threshold distance based on a rate of travel of the user or a mode of transportation used by the user of the client device 110. The location module 310 may determine a user's rate of travel based on changes in the physical location of the client device 110 during various time intervals. Additionally, the user may provide content to the social networking system 140 or include information in a user profile identifying the user's mode of transportation at different times. For example, the location module 310 applies a larger threshold distance when determining whether a client device's physical location is in proximity to a physical location of an entity for a user who frequently drives than for a user who frequently walks. Furthermore, if a user frequently takes public transportation, the location module 310 may use a distance between the physical location of the client device 110 and a physical location of the entity based on distance using public transportation routes to the physical location associated with the entity ad rather than a direct distance between physical location of the client device 110 and the physical location of the entity.

In another embodiment, the location module 310 determines a distance between the physical location of the entity associated with an advertisement and a previous location of the client device 110. The location module 310 accesses the history of physical locations of the client device 110 and determines if a prior physical location of the client device 110 was within a threshold distance of the physical location of the entity to determine if the physical location of the client device 110 is in proximity to the physical location of the entity. In one embodiment, the location module 310 uses the history of physical locations of the client device 110 to determine whether the client device 110 was in proximity to a physical location of the entity during a specified time interval. For example, the location module 310 retrieves prior physical locations of the client device 110 during two weeks preceding a date an ad associated with an entity having a physical location is selected for presentation, rather retrieving prior physical locations of the client device 110 during an indefinite time interval.

The location module 310 may alternatively or additionally determine a distance between the physical location of the entity associated with an advertisement and a predicted physical location of the client device 110 to determine if the client device 110 is in proximity of the physical location of the entity. In various embodiments, the location module 310 predicts future locations of client device 110 based on the history of physical locations of the client device 110. For example, the location module 310 predicts the client device 110 will be at a physical location associated with the user's work at certain times on certain days based on prior physical locations of the client device 110. The location module 310 determines whether a predicted location of the client device 110 is in proximity to the physical location of the entity as described above. In some embodiments, the predicted location of the client device 110 is a route between predicted destinations. For example, the location module 310 predicts a route a user travels between physical locations of user's home and work. In this example, the location module 310 may determine whether the route traveled by the user, or whether a physical location included in the route traveled by the user, is in proximity to a physical location of the entity associated with an ad. Furthermore, one embodiment of the location module 310 determines whether one or more physical locations predicted for a client device 110 are in proximity to the physical location of the entity associated with the ad for a specified period of time after the ad is selected, such as one week.

If the entity associated with the ad has multiple physical locations, the location module 310 may select one of the physical locations to associate with the ad. In various embodiments, the location module 310 selects a physical location of the entity to associate with the ad based on distances or travel times between a current physical location of the client device 110, one or more historical physical locations of the client device 110, or one or more predicted physical locations of the client device 110 and physical locations associated with the entity. Additional information, such as current wait times at the various physical locations associated with the entity, hours of operation of various physical locations associated with the entity, or other factors may be used to select a physical location of the entity to associate with the ad. For example, if multiple physical locations of the entity are within a threshold distance of a current physical location of the client device 110, the location module 310 selects the physical location of the entity nearest to the user or having a shortest travel time for the user. In this example, the location module 310 accesses map data and/or traffic data to select the physical location. As another example, if the physical locations of the entity are restaurants, coffee shops, service providers, or other types of physical locations that may have a wait time for visitors, the location module 310 selects a physical location having the shortest wait time to associate with the ad. In this example, the location module 310 may retrieve wait time data for the locations from websites of the entities or other systems. In yet another example, if an entity's physical locations are open different hours, the location module 310 selects a physical location that is open at the time the ad is displayed to the user.

The ad display module 315 generates advertisement units for presentation to a user by a client device 110. For ads associated with entities having a physical location in proximity to a physical location of the user, the ad display module 315 generates an ad unit including an indicator of the physical location of the entity. Example indicators of physical locations include a time to reach, a distance to, or a direction to the physical location. The indicator may also include context providing a statement about the proximity of the user to the location and/or the current state or status of the location (e.g., open, wait time, etc.). For example, a generated ad unit includes the ad content as well as an indication that a physical location of the entity associated with the ad content is open and is proximate to the user when the ad unit is presented or an indication that he physical location of the entity is a certain number of miles away from the user's current location. An indicator may also indicate that another user connected to the user in the social networking system has expressed a preference for the physical location of the entity associated with the ad (i.e., the other user "likes" the physical location of the entity); for example, the ad unit include an indicator such as "your friend Tom Banks likes The Coffee Shop in Mountain View, which is two minutes away from you, is open now, and has zero wait time". In some embodiments, the indicator may identify other types of actions associated with the physical location of the entity associated with the ad, such as checking-into the physical location of the entity associated with the ad. The ad display module 315 may modify properties of the indicator to provide additional information to a user about the physical of the entity associated with the ad or a route from the physical location of the client device 110 to the physical location of the entity associated with the ad. In one embodiment, the ad unit generated by the ad display module 315 also includes a link that, when selected, presents additional information about the physical location to the user. For example, selecting the link retrieves additional information about the physical location of the entity associated with the ad from a third party system 130 or from the social networking system 140 or executes an application on a client device 110 on which the ad unit is presented to obtain additional information about the physical location.

In some embodiments, one or more links included in the ad unit execute an application installed on a client device 110 presenting the ad unit when a link is selected by the user. For example, a link includes an application identifier that is communicated to an operating system of the client device 110 along with an instruction to execute the application identifier when the user selects the link. A link may also include instructions that are communicated to an application identified by the link when the link is selected; the instructions may identify information for use by the application or for presentation by the application. For example, selecting a link included in the ad unit executes a navigation application installed on a client device 110 presenting the ad unit and identifies address of the physical location of the entity associated with the ad to the navigation application. As another example, selecting a link included in the ad unit executes an application installed on a client device 110 presenting the ad unit to make a reservation at the physical location of the entity associated with the advertisement or to place an order to be picked up at the physical location of the entity associated with the advertisement and identifies the physical location of the entity associated with the advertisement to the application.

The landing page module 320 may modify the links included in the ad unit based on characteristics of the physical location of the entity associated with the ad. For example, the landing page selects a link identifying an application based on a wait time at the physical location. For example, the landing page module 320 includes a link to execute a navigation application when selected in the ad unit if the wait time is shorter than a threshold length, but includes a link to execute an application for making a reservation or placing an order when selected in the ad unit. The threshold length of time may be a fixed value (e.g., thirty minutes), a user setting, or dependent on the entity associated with the ad. For example, a threshold length for a restaurant may be longer than a threshold length for a coffee shop.

The landing page module 320 generates a landing page providing additional information about a physical location of an entity associated with an ad unit. For example, the landing page module 320 generates a landing page in response to receiving an indication from a client device that a user selected a link included in the ad unit. The landing page may include additional information associated with the physical location of the entity associated with the ad, such as directions to the physical location, reviews of the physical location of the entity associated with the ad, wait time at the physical location of the entity associated with the ad, a menu from the physical location of the entity associated with the ad, an option to reserve a table at the physical location of the entity associated with the ad, an option to place an order from the physical location of the entity associated with the ad, an option to purchase tickets to attend the physical location of the entity associated with the ad, an option to make an appointment for the physical location of the entity associated with the ad, or an option to perform any other suitable action. In one embodiment, the landing page module 320 communicates the landing page to a client device 110 for presentation to the user via a web browser or other application executing on the client device 110. In another embodiment, generated landing page includes one or more links that, when selected by a user, execute one or more applications installed on the client device 110, such as an application executing on the client device 110 that communicates with the social networking system 140 or a navigation application.

Figure 4:
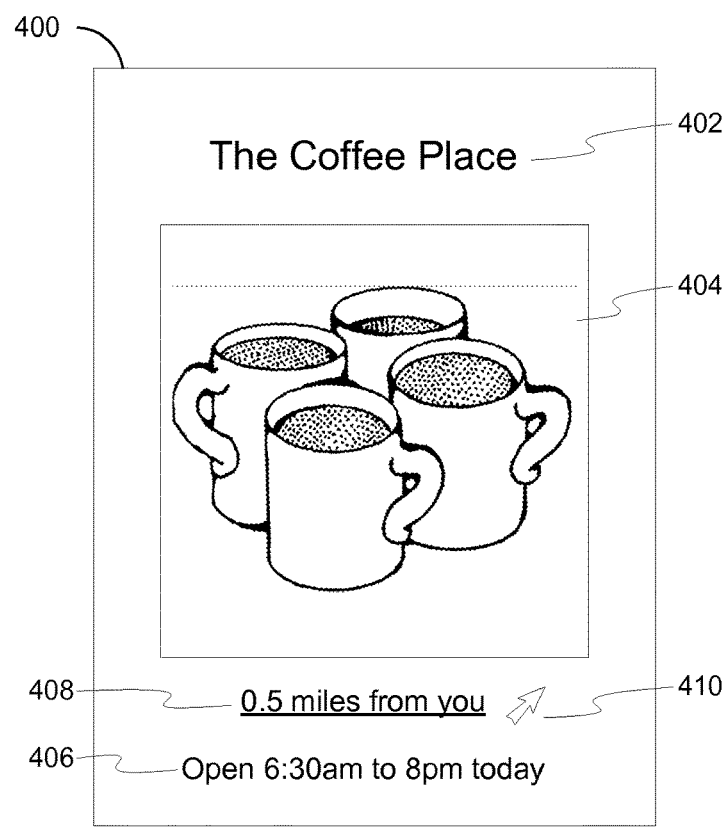
FIG. 4 illustrates an example advertisement with an indicator of a physical location.

An example ad unit generated by the ad display module 315 and indicating an entity's physical location is illustrated in FIG. 4. The example of FIG. 4 is an ad unit 400 for a coffee shop, which is a business with a physical location. The ad unit 400 includes advertising content (or an "ad") provided by the entity, such as a title 402 and picture 404. In some embodiments, the user may interact with the advertising content provided by the entity (e.g., by clicking on the title 402 or picture 404) to view more information about the entity or to view details about the entity. For example, a website of the entity is displayed in response to the user clicking on the title 402.

As shown in FIG. 4, the ad unit 400 also includes information about the physical location selected to be associated with the ad unit 400. Information about a physical location of an entity associated with the ad unit 400 includes, for example, hours 406 the physical location of the entity is open. The information about the physical location of the entity associated with the ad unit 400 also includes an indicator of the physical location of the entity. In the example of FIG. 4, the physical location indicator includes a distance indicator 408 specifying the distance from a physical location of the client device 110 to the coffee shop and a compass heading 410 indicating the direction of the coffee shop from the physical location of the client device 110. Other information may also be included in the physical location indicator, such as a travel time to the coffee shop's physical location from the physical location of the client device 110.

The distance or travel time provided in the distance indicator 408 may be a distance or a travel time from the current physical location of the client device 110 to the physical location of the entity associated with the ad unit 400, a distance or a travel time from a previous physical location of the client device 110 to the physical location of the entity associated with the ad unit 400, a distance or a travel time from a predicted future location of the client device 110 to the physical location of the entity associated with the ad unit 400, or a combination thereof. For example, if the client device 110 is currently in proximity to the physical location of the entity associated with the ad unit 400, the distance indicator 408 provides a distance from the current physical location of the client device 110 to the physical location. If a prior physical location of the client device 110 was in proximity to the physical location of the entity associated with the ad, the distance indicator 408 may provide a distance from the prior physical location of the client device 110 that was in proximity to the physical location of the entity associated with the ad, provide the distance between the current physical location of the client device 110 and the physical location of the entity associated with the ad, or both. For example, the distance indicator 408 indicates that the client device 110 is currently 10 miles from the physical location of the entity associated with the ad but was 100 yards from the physical location of the entity associated with the ad one day prior. Similarly, if a predicted future physical location of the client device 110 is in proximity to the physical location of the entity associated with the ad, the distance indicator 408 may provide a distance from the current physical location of the client device 110 to the physical location of the entity associated with the ad, a distance from the predicted future physical location of the client device 110 location to the physical location of the entity associated with the ad, or both. For example, if the physical location of the entity associated with the ad is one half mile from the route a user is predicted to travel, the distance indicator 408 may indicate both the current distance between the physical location of the entity associated with the ad and the current physical location of the client device as well as a distance between from the predicted route and the physical location the entity associated with the ad.

In one embodiment, the physical location indicator includes a selectable link to obtain additional information about the physical location of the entity associated with the ad. For example, the distance indicator 408 is a selectable link that, when selected, retrieves additional information about the physical location of the coffee shop. Other components of the ad unit 400 may additionally or alternatively be links that, when selected, execute an application installed on the client device 110 or retrieve information about the physical location of the coffee shop from different sources (e.g., a third party system 130).

Properties of the distance indicator 408 may be modified to provide additional information to a user. In one embodiment, the distance indicator 408 is color-coded to indicate an amount of traffic between the physical location of the client device 110 and the physical location of the entity associated with the ad. For example, the ad display module 315 displays the distance indicator 408 as green to indicate light or normal traffic between the physical location of the client device 110 and the physical location of the entity associated with the ad, yellow to indicate heavier traffic between the physical location of the client device 110 and the physical location of the entity associated with the ad, and red to indicate heavy traffic between the physical location of the client device 110 and the physical location of the entity associated with the ad. In another embodiment, the distance indicator 408 is color-coded to indicate whether the physical location of the entity associated with the ad is currently open. For example, the ad display module 315 displays the distance indicator 408 as green to indicate that the physical location of the entity associated with the ad is open, yellow to indicate the physical location of the entity associated with the ad is closing in less than a threshold amount of time, and red to indicate the physical location of the entity associated with the ad is closed. In yet another embodiment, the distance indicator 408 is color-coded to indicate a duration of a wait time at the physical location of the entity associated with the ad.

Similarly, properties of the compass heading 410 may be modified to provide additional information to a user. In one embodiment, the orientation of the compass heading 410 is based at least in part based on orientation of the client device 110. In one embodiment, the ad display module 315 receives an indicator of the client device's orientation relative to the magnetic field of the Earth from a magnetometer of the client device 110, and rotates the compass heading 410 to point in a direction the user of the client device 110 would travel to reach the physical location associated with the ad unit 400. The compass heading 410 may be rotated in two dimensions (within the plane of the client device 110) or in three dimensions. For example, if the user is facing the direction of travel to the physical location associated with the ad unit 400, the ad display module 315 rotates the compass heading 410 to point the user forward. If the compass heading 410 is rotated in two dimensions, the ad display module 315, or an application presenting the ad unit on the client device 110, displays the compass heading 410 as pointing upward on the display of the client device 110. If the compass heading 410 is rotated in three dimensions, the ad display module 315, or an application presenting the ad unit 400 on the client device 110, displays the compass heading 410 as pointing upward if the client device 110 is oriented parallel to the ground, and displays the compass heading 410 as pointing into the display if the client device 110 is oriented perpendicularly to the ground. In another embodiment, the ad display module 315, or an application presenting the ad unit 400 on the client device 110, displays the compass heading 410 relative to a fixed axis. For example, if the physical location of the entity associated with the ad is north of the physical location of the client device 110, the ad display module 315, of an application presenting the ad unit 400 on the client device 110, displays the compass heading 410 as pointing upward on the display regardless of the orientation of the client device 110.

Other properties of the compass heading 410 may also be modified by the ad display module 315. For example, the ad display module 315 changes a color of the compass heading 410 to indicate an amount of traffic between the user and the physical location associated with the ad unit 400. As another example, the ad display module 315 changes a length of the compass heading 410 based on a distance between the physical location of the client device 110 and the physical location of the entity associated with the ad, so the compass heading 410 is displayed with a longer length for longer distances and a shorter length for shorter distances.

Figure 5:
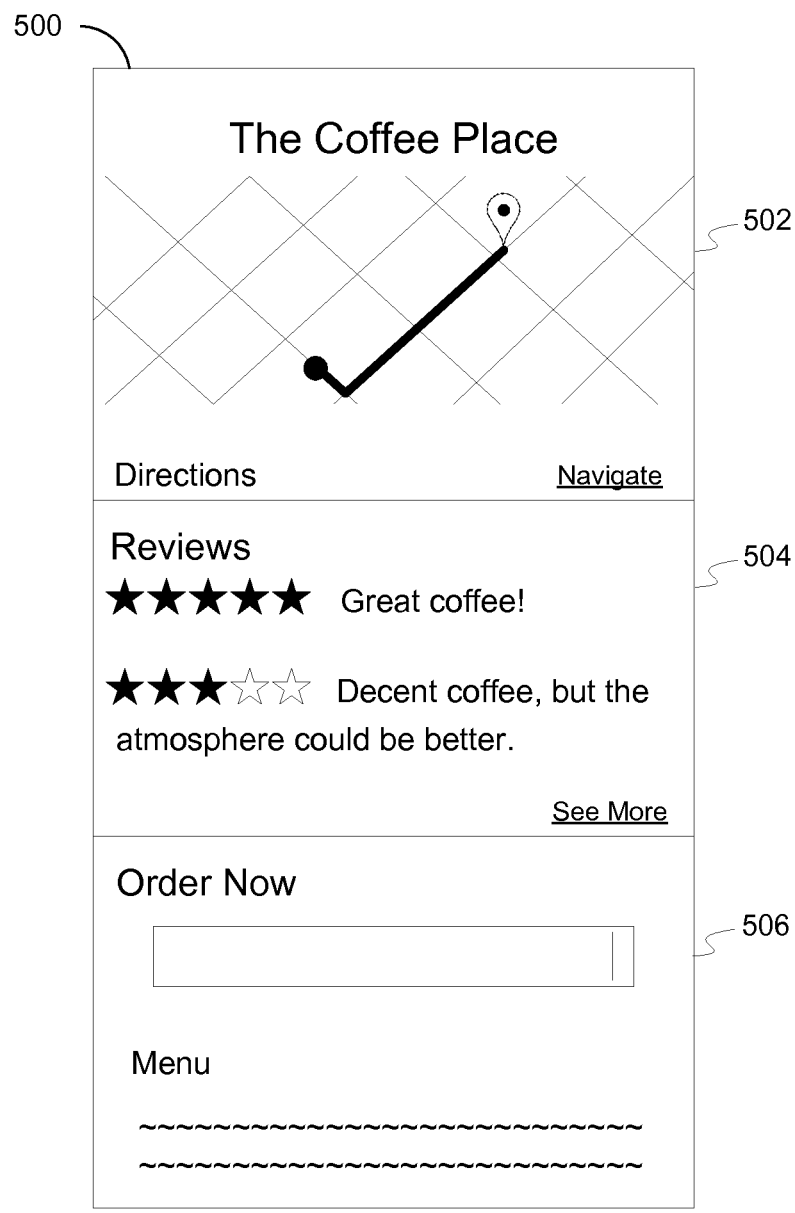
FIG. 5 illustrates an example landing page associated with an advertisement with location content.

An example landing page 500 presented to a user is illustrated in FIG. 5. The landing page 500 is displayed by the client device 110 in response to a user interaction with an ad unit including an ad associated with a physical location of an entity, such as a user selection of the direction indicator 408 of the ad unit 400 shown in FIG. 4. In the example shown in FIG. 5, the landing page 500 includes directions 502 to the physical location of the entity associated with the ad, reviews 504 for the entity associated with the ad and/or reviews for the physical location of the entity associated with the ad, and a user interface 506 for ordering items to be picked up at the physical location. Thus, a user may interact with the landing page 500 to place an order at the physical location of the entity associated with the ad and obtain directions for navigating to the physical location of the entity associated with the ad to pick up the order. Other information may also be displayed on the landing page 500. In one embodiment, if the landing page 500 is larger than the dimensions of a display device of the client device 110, the landing page 500 is vertically or horizontally scrollable.

Figure 6:
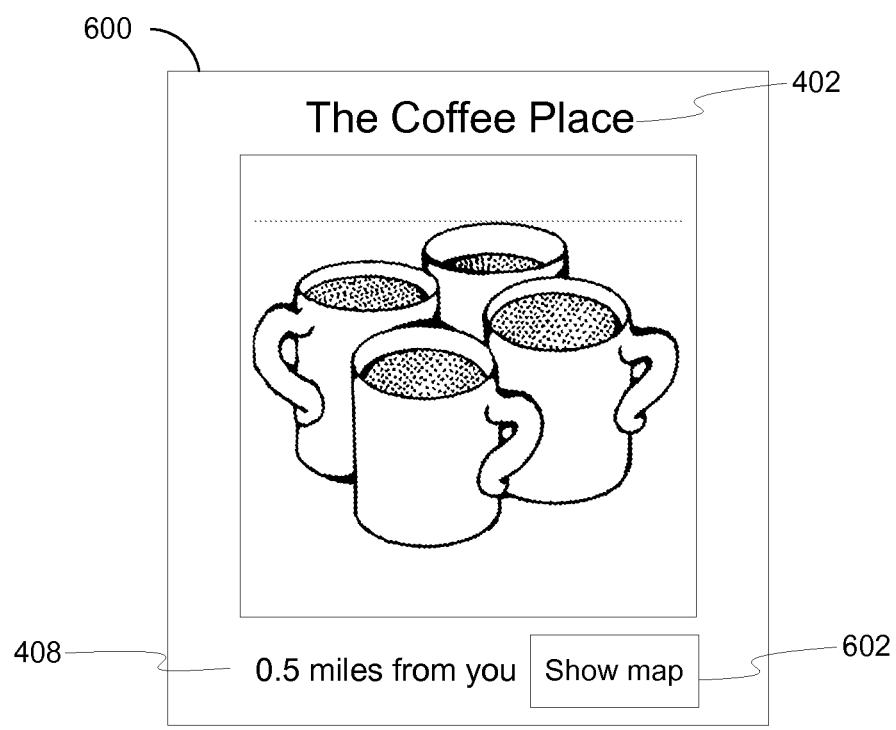
FIG. 6 illustrates another example advertisement unit.

FIG. 6 illustrates another example advertisement unit 600 ("ad unit") generated by the ad display module 315 that indicates an entity's physical location. In the example of FIG. 6, the ad unit 600 includes advertisement content (an "ad") associated with the entity or a physical location (such as the title 402 and the distance indicator 408), as well as a link 602 that, when selected by a user, displays a map identifying the physical location of the entity associated with the ad in the ad unit 600. While the link 602 is a dedicated interface element in the example of FIG. 6, other portions of the ad unit 600 may present a map or directions to the physical location of the entity associated with the ad when selected by the user. If a user selects the link 602, the ad unit 600 is expanded to display the map within the ad unit 600, allowing a user of the client device 110 can view information about the physical location of the entity associated with the ad by directly interacting with the ad unit 600. For example, if the ad unit 600 is displayed within a web page, an application, or a feed of content items, the user interacts with the ad unit 600 to view information about the physical location without leaving the web page, application, or feed of content items. In one embodiment, the ad display module 315 retrieves an address or coordinates of the physical location of the entity associated with the ad that is communicated to a client device 110 with the ad unit 600, so an image of the map or an overview of directions to the physical location of the entity associated with the ad is presented when the ad unit 600 is displayed to a user on a client device 110 of and prior to receiving a selection of the link 602, reducing the amount of time needed for the client device 110 to obtain and display the map when the link 602 is selected.

Figure 7A:
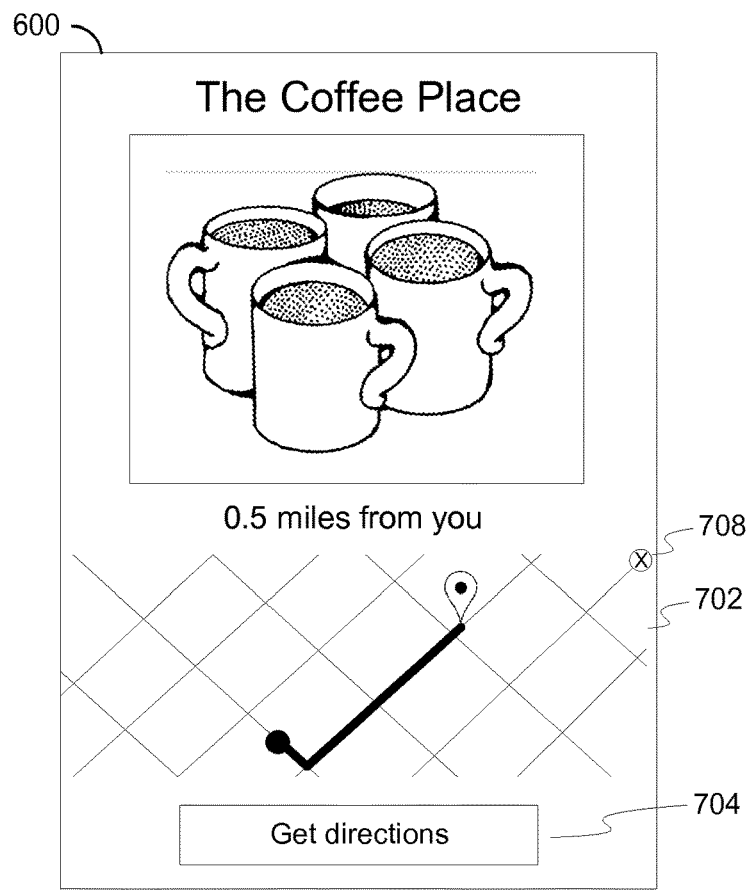
FIGS. 7A-7B illustrate example advertisement units including a map identifying a physical location.
Figure 7B:
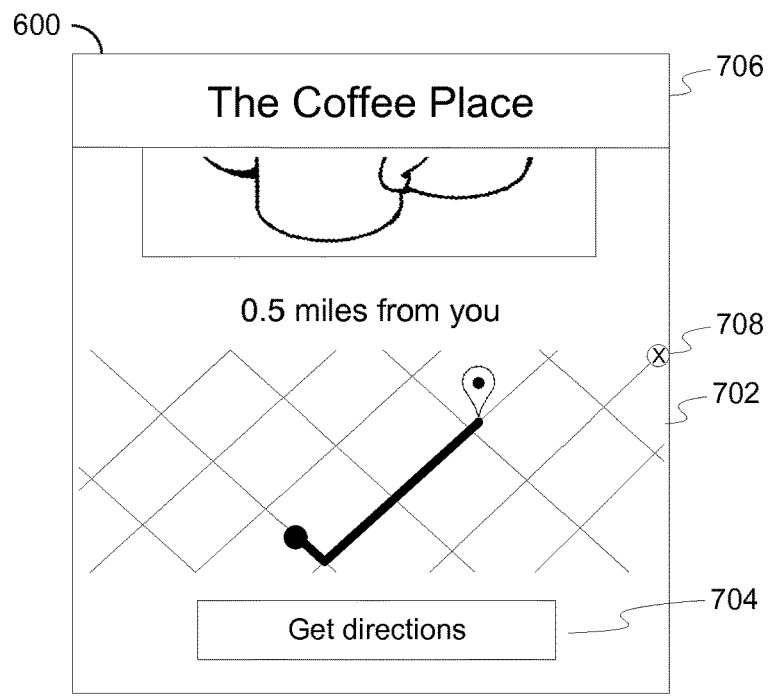

FIGS. 7A and 7B illustrate examples of the ad unit 600 after selection of the link 602. In the example of FIG. 7A, the ad unit 600 is expanded to display the advertisement content in addition to a map 702 identifying the physical location of the entity associated with the ad. In the example of FIG. 7A, the ad unit 600 is expanded to occupies a larger area of a display device of the client device 110 than before the link 602 was selected. In the example of FIG. 7B, the ad unit 600 has been scrolled to display the map 702, so the ad unit 600 occupies the same (or substantially the same) area of the display device of the client device 110 than before the link 602 was selected and the map 702 was displayed. As shown in FIG. 7B, portion of the content of the ad unit 600 may be scrolled off the display to display the map 702. In one embodiment, the title 402 or an identifier of the entity is pinned to an upper boundary of the ad unit 600 as the ad unit 600 is scrolled to maintain a persistent identifier 706 of the entity associated with the ad presented by the ad unit 600.

As shown in FIGS. 7A and 7B, the map 702 displays a physical location of the entity associated with the ad unit 600 and a current physical location of the client device 110 displaying the ad unit 600. If the entity has multiple physical locations in proximity to the client device 110, a physical location of the entity is selected for presentation in the map 702 as described above in conjunction with FIG. 3. For example, the ad display module 315 selects a physical location of the entity associated with the ad closest to the client device 110, a physical location of the entity associated with the ad closest to a predicted future physical location of the client device 110, or a physical location of the entity associated with the ad associated with the shortest wait time. The selected physical location of the entity associated with the ad is communicated to the client device along with the ad. In another embodiment, the map 702 identifies two or more physical locations of the entity associated with the ad. For example, the ad display module 315 selects physical locations of the entity associated with the ad within a specified radius of the physical location of the client device 110 and communicates the selected physical locations of the entity associated with the ad to the client device 110 along with the ad for presentation.

In one embodiment, the map 702 is associated with instructions that, when executed by the client device 110, execute a map application installed on the client device 110. For example, when the user selects the map 702, the client device 110 executes the instructions, causing the client device 110 to execute the map application. In some embodiments, the instructions identify an address or coordinates of the physical location of the entity associated with the ad, and the address or coordinates to the map application. This allows the map application to include information identifying the physical location of the entity associated with the ad when it is executed. Furthermore, when the map 702 is displayed, one embodiment of the ad unit 600 includes a link 704 to obtain directions from the current physical location of the client device 110 to the physical location of the entity associated with the ad from the social networking system 140, from a third party system 130 associated with the ad, or from another source. In some embodiments, the link 704 includes instructions that, when executed by the client device 110, execute a map application or another application included on the client device 110 and communicate information identifying the physical location of the entity associated with the ad (e.g., an address, coordinates) to the map application or other application along with a request for directions to simplify presentation of directions to the physical address of the entity associated with the ad to the user.

When the map 702 is displayed within the ad unit 600, the ad unit 600 may also display an element 708 to close the map 702. A user of the client device 110 may toggle between displaying the map 702 and not displaying the map 702. For example, the user may close the map 702 after viewing the location of the entity to reduce the display area occupied by the ad unit 600. In the examples of FIGS. 7A-7B, the element 708 is an "x." However, in other embodiments, the map 702 is closed in response to an additional user selection of the map link 602, in response the client device 110 receiving a specific gesture (e.g., swiping the map away 702), or in response to other user interactions with the ad unit 600.

Displaying Advertisements for Physical Locations

Figure 8:
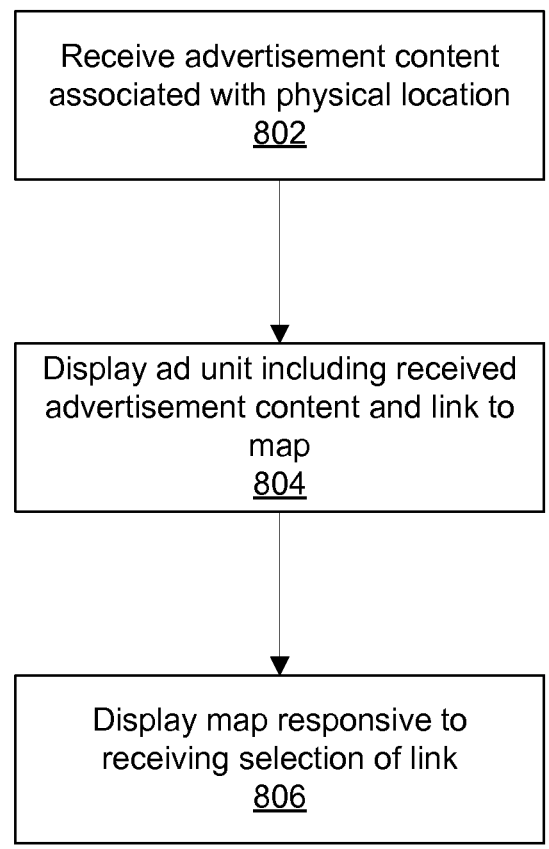
FIG. 8 is a flowchart illustrating a process for displaying advertisements associated with physical locations, according to one embodiment.

FIG. 8 is a flowchart illustrating one embodiment of a process for displaying advertisements associated with physical locations. In one embodiment, the steps of the process are performed by the client device 110. Other embodiments may perform additional, fewer, or different steps, and the steps may be performed in different orders.

The client device 110 receives 802 advertisement content associated with an entity having a physical location. In one embodiment, the advertisement content is selected by the social networking system 140. For example, the advertisement content is selected by the social networking system 140 based on characteristics of a user (e.g., demographic information, connections to other users, actions performed by the user) to be presented with the advertisement content and satisfying targeting criteria associated with the advertisement content and a bid amount associated with the ad content. If the entity has multiple physical locations, the social networking system 140 selects a physical location of the entity based on proximities between various physical locations of the entity and a physical location of the client device 110 as described above in conjunction with FIG. 3. For example, the social networking system 140 selects a physical location of the entity that is less than a threshold distance from a physical location of the client device 110 at the time the ad is selected, selects a physical location of the entity that is less than a threshold distance from a previous location of the client device 110, or selects a physical location of the entity that is less than a threshold distance from a predicted future location of the client device 110. In addition to the advertisement content, the client device also receives instructions that, when executed by the client device 110, cause presentation of information identifying the physical location associated with the advertisement content.

The client device 110 displays 804 an ad unit including the received advertisement content and also including the instructions that cause presentation of information identifying the physical location associated with the advertisement content when executed. The displayed ad unit may include an indicator of the physical location, which includes a distance or travel time from the physical location of the client device 110 to the physical location of the entity associated with the advertisement content, a compass heading indicating a direction from the physical location of the client device 110 to the physical location of the entity associated with the advertisement content, or other information. In one embodiment, properties of the physical location indictor are modified to provide additional information to the user. For example, the physical location indicator is displayed in a different color or size to indicate different distances to the physical location of the entity associated with the advertisement content and the physical location of the client device 110, an amount of traffic between the physical location of the client device 110 and the physical location of the entity associated with the advertisement content, or other information. The displayed ad unit also includes a link to information identifying the physical location of the entity.

Responsive to receiving a user selection of the link, the client device 110 executes the instructions causing presentation of information identifying the physical location of the entity associated with the advertisement content, and displays 806 information identifying the physical location of the entity associated with the advertisement content within the ad unit. For example, the client device 110 displays 806 a map identifying the physical location of the entity associated with the advertisement content within the ad unit when the user selects the link. In one embodiment, the client device 110 increases a display size of the ad unit to display 806 the map (or other information), allowing simultaneous presentation of the advertisement content and the map are displayed simultaneously. In another embodiment, the client device 110 scrolls a portion of the advertisement content from presentation via the ad unit to display 806 the map or other information without increasing the size of the ad unit. A header identifying the entity or the physical location may be persistently displayed in the ad unit as the advertisement content is scrolled. Additionally, the advertisement content received 802 by the client device 110 may include additional instructions that, when executed by the client device 110, communicate information identifying the physical location of the entity associated with the advertisement content to an application executing on the client device 110 and execute the application. In some embodiments, the client device 110 executes the additional instructions when an interaction with the map or other displayed information is received, as described above in conjunction with FIGS. 7A and 7B.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
selecting advertisement content for presentation to a user of a social networking system, wherein the advertisement content is associated with an entity of a plurality of entities, the plurality of entities including a first subset of entities associated with at least one physical location and a second subset of entities not associated with physical locations, wherein the selection is based on whether a user profile of the user on the social networking system has one or more characteristics that satisfy targeting criteria of an advertisement request that includes the advertisement content, the one or more characteristics including at least one characteristic selected from a group consisting of: biographic information, demographic information, connections to other users, and actions performed by the user in the social networking system;

responsive to selecting the advertisement content for presentation to the user, determining whether the entity associated with the selected advertisement content is included in the first subset of entities;

generating an advertisement ("ad") unit including the selected advertisement content for presentation to the user;

responsive to determining that the selected advertisement content is associated with an entity having at least one physical location:

selecting a physical location of the entity for identification by the selected advertisement content, comprising:

determining whether the entity has more than one location, and responsive to determining that entity has more than one location, selecting the physical location of the entity based on proximities of a physical location of a client device associated with the user to the physical locations of the entity associated with the advertisement content; and appending the ad unit including the selected advertisement content with a first actionable link and instructions that, when executed by the client device in response to receiving a first user input via the first actionable link, cause the client device to:

expand one or more dimensions of the ad unit, and present a map in the expanded ad unit identifying the physical location of the client device and the selected physical location of the entity in the map while simultaneously presenting the advertisement content in the expanded ad unit; and communicating the ad unit to the client device for presentation to the user.

2. The method of claim 1, wherein the instructions, when executed by the client device in response to receiving the first user input via the first actionable link, further cause the client device to:

present a second actionable link, and wherein the instructions that, when executed by the client device in response to receiving a second user input via the second actionable link, cause the client device to execute an application installed on the client device.

3. The method of claim 2, wherein the instructions, when executed by the client device in response to receiving the second user input via the second actionable link, further cause the client device to communicate an identifier of the selected physical location of the entity to the application executed by the client device.

4. The method of claim 3, wherein the identifier of the selected physical location of the entity is selected from a group consisting of: an address, coordinates, and any combination thereof.

5. The method of claim 1, wherein selecting the physical location of the entity for identification by the advertisement content based on proximities of the physical location of the client device associated with the user to the physical locations of the entity associated with the advertisement content comprises:

determining distances between the physical location of the client device associated with the user and at least a set of the physical locations of the entity associated with the advertisement content; and selecting a physical location of the entity associated with the advertisement content having a minimum distance to the physical location of the client device.

6. The method of claim 1, wherein selecting the physical location of the entity for identification by the advertisement content based on proximities of the physical location of the client device associated with the user to the physical locations of the entity associated with the advertisement content comprises:

determining travel times between the physical location of the client device associated with the user and at least a set of the physical locations of the entity associated with the advertisement content; and selecting a physical location of the entity associated with the advertisement content having a minimum travel time to the physical location of the client device.

7. The method of claim 1, wherein the physical location of the client device associated with the user is selected from a group consisting of: a current physical location of the client device associated with the user, a prior physical location of the client device associated with the user, a predicted future location of the client device associated with the user, and any combination thereof.

8. The method of claim 1, wherein the map identifying the selected physical location of the entity describes a route from the physical location of the client device associated with the user to the selected physical location of the entity.

9. The method of claim 1, wherein the instructions, when executed by the client device in response to receiving the first user input via the first actionable link, further cause the client device to present a second actionable link and additional instructions that, when executed by the client device in response to receiving a second user input via the second actionable link, cause the client device to close the map in the ad unit.

10. A computer program product containing a non-transitory computer readable storage medium with instructions encoded thereon that, when executed by a processor, cause the processor to:

select advertisement content for presentation to a user of a social networking system, wherein the advertisement content is associated with an entity of a plurality of entities, the plurality of entities including a first subset of entities associated with at least one physical location and a second subset of entities not associated with physical locations, wherein the selection is based on whether a user profile of the user on the social networking system has one or more characteristics that satisfy targeting criteria of an advertisement request that includes the advertisement content, the one or more characteristics including at least one characteristic selected from a group consisting of: biographic information, demographic information, connections to other users, and actions performed by the user in the social networking system;

responsive to selecting the advertisement content for presentation to the user, determine whether the entity associated with the selected advertisement content is included in the first subset of entities;

generate an advertisement ("ad") unit including the selected advertisement content for presentation to the user;

responsive to determining that the selected advertisement content is associated with an entity having at least one physical location:
   select a physical location of the entity for identification by the selected advertisement content, comprising:
      determining whether the entity has more than one location, and
      responsive to determining that entity has more than one location, selecting the physical location of the entity based on proximities of a physical location of a client device associated with the user to the physical locations of the entity associated with the advertisement content; and
   append the ad unit including the selected advertisement content with a first actionable link and instructions that, when executed by the client device in response to receiving a first user input via the first actionable link, cause the client device to:
      expand one or more dimensions of the ad unit, and
      present a map in the expanded ad unit identifying the physical location of the client device and the selected physical location of the entity in the map while simultaneously presenting the advertisement content in the expanded ad unit; and
communicate the ad unit to the client device for presentation to the user.

11. The computer program product of claim 10, wherein the map identifying the selected physical location of the entity describes a route from the physical location of the client device associated with the user to the selected physical location of the entity.

12. The computer program product of claim 10, wherein the instructions, when executed by the client device in response to receiving the first user input via the first actionable link, further cause the client device to:
   present a second actionable link, and
   wherein the instructions that, when executed by the client device in response to receiving a second user input via the second actionable link, cause the client device to execute an application installed on the client device.

13. The computer program product of claim 12, wherein the instructions, when executed by the client device in response to receiving the second user input via the second actionable link, further cause the client device to communicate an identifier of the selected physical location of the entity to the application executed by the client device.

14. The computer program product of claim 13, wherein the identifier of the selected physical location of the entity is selected from a group consisting of: an address, coordinates, and any combination thereof.

15. The computer program product of claim 10, wherein to select the physical location of the entity for identification by the advertisement content based on proximities of the physical location of the client device associated with the user to the physical locations of the entity associated with the advertisement content comprises further instructions that, when executed by the processor, cause the processor to:
   determine distances between the physical location of the client device associated with the user and at least a set of the physical locations of the entity associated with the advertisement content; and
   select a physical location of the entity associated with the advertisement content having a minimum distance to the physical location of the client device.

16. The computer program product of claim 10, wherein to select the physical location of the entity for identification by the advertisement content based on proximities of the physical location of the client device associated with the user to the physical locations of the entity associated with the advertisement content comprises further instructions that, when executed by the processor, cause the processor to:
   determine travel times between the physical location of the client device associated with the user and at least a set of the physical locations of the entity associated with the advertisement content; and
   select a physical location of the entity associated with the advertisement content having a minimum travel time to the physical location of the client device.

17. The computer program product of claim 10, wherein the physical location of the client device associated with the user is selected from a group consisting of: a current physical location of the client device associated with the user, a prior physical location of the client device associated with the user, a predicted future location of the client device associated with the user, and any combination thereof.

18. The computer program product of claim 10, wherein the instructions, when executed by the client device in response to receiving the first user input via the first actionable link, further cause the client device to present a second actionable link and additional instructions that, when executed by the client device in response to receiving a second user input via the second actionable link, cause the client device to close the map in the ad unit.

\* \* \* \* \*